United States Patent
Shang et al.

(10) Patent No.: US 11,046,592 B2
(45) Date of Patent: Jun. 29, 2021

(54) PRODUCTION OF REACTIVE OXIDATIVE SPECIES BY PHOTOCATALYTIC ACTIVATION OF CHLORINE (I) UNDER ULTRAVIOLET/VISIBLE LIGHT/NEAR INFRARED IRRADIATION

(71) Applicant: The Hong Kong University of Science and Technology, Hong Kong (CN)

(72) Inventors: Chii Shang, Hong Kong (CN); Li Ling, Hong Kong (CN); Zihang Cheng, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 16/696,454

(22) Filed: Nov. 26, 2019

(65) Prior Publication Data

US 2020/0165145 A1 May 28, 2020

Related U.S. Application Data

(60) Provisional application No. 62/917,202, filed on Nov. 28, 2018.

(51) Int. Cl.
  *C02F 1/32* (2006.01)
  *C02F 1/72* (2006.01)
  *C02F 1/76* (2006.01)

(52) U.S. Cl.
  CPC ............... *C02F 1/32* (2013.01); *C02F 1/725* (2013.01); *C02F 1/763* (2013.01)

(58) Field of Classification Search
  CPC .... C02F 1/32; C02F 1/725; C02F 1/76; C02F 1/763; C02F 2201/3222; C02F 2305/10; B01J 19/123; B01J 19/127
  See application file for complete search history.

(56) References Cited

U.S. PATENT DOCUMENTS 9,593,026 B2 * 3/2017 Boal .................. C02F 1/725

FOREIGN PATENT DOCUMENTS

| CN | 101607771 A | 12/2009 |
|----|-------------|---------|
| CN | 103523900 A | 1/2014 |
| CN | 104944513 A | 9/2015 |
| CN | 106082390 A | 11/2016 |

(Continued)

OTHER PUBLICATIONS

Jin, J. et al., "Assessment of the UV/Chlorine process as an advanced oxidation process," *Water Research*, 2011, 45:1890-1896, 2010 Elsevier Ltd.

(Continued)

*Primary Examiner* — Lessanework Seifu
(74) *Attorney, Agent, or Firm* — Saliwanchik, Lloyd & Eisenschenk

(57) ABSTRACT

A system to produce reactive oxidative species in a fluid medium containing a source of Cl(I) by irradiating a solid photocatalyst suspended in the fluid medium or residing on a surface that is contactable by the fluid with electromagnetic radiation. The electromagnetic radiation can be in the UV, near-UV, visible, or near-IR consistent with the photocatalyst employed. The source of Cl(I) in certain embodiments is $Cl_2$, HOCl, or $H_2NCl$. The photocatalyst is $g$-$C_3N_4$, $TiO_2$, BBiOBr, or any other solid insoluble photocatalyst.

20 Claims, 7 Drawing Sheets

(56) References Cited

FOREIGN PATENT DOCUMENTS

| KR | 10-2016-0148284 A | | 12/2016 |
| SG | 194789 A1 | | 12/2013 |
| WO | WO2018/073782 | * | 4/2018 |

OTHER PUBLICATIONS

Yang, B. et al., "Removal of carbamazepine in aqueous solutions through solar photolysis of free available chlorine," *Water Research*, 2016, 100:413-420, Elsevier Ltd.

Kumar, A. et al., "Development of g-$C_3N_4$/$TiO_2$/$Fe_3O_4$@$SiO_2$ heterojunction via sol-gel route: A magnetically recyclable direct contact Z-scheme nanophotocatalyst for enhanced photocatalytic removal of ibuprofen from real sewage effluent under visible light," *Chemical Engineering Journal*, 2018, 353:645-656, Elsevier B.V.

Wang, W. et al., "Synergistic effect between UV and chlorine (UV/chlorine) on the degradation of carbamazepine: Influence factors and radical species," *Water Research*, 2016, 98:190-198, Elsevier Ltd.

Yang, X. et al., "PPCP degradation by UV/chlorine treatment and its impact on DBP formation potential in real waters," *Water Research*, 2016, 98:309-318, Elsevier Ltd.

Fang, J. et al., "The Roles of Reactive Species in Micropollutant Degradation in the UV/Free Chlorine System," *Environmental Science & Technology*, 2014, 45:1859-1868, American Chemical Society.

Wu, Z. et al., "Roles of reactive chlorine species in trimethoprim degradation in the UV/chlorine process: Kinetics and transformation pathways," *Water Research*, 2016, 104:272-282, Elsevier Ltd.

Long, C. A. et al., "Rate of Reaction of Superoxide Radical with Chloride-Containing Species," *The Journal of Physical Chemistry*, 1980, 84(5):557-558, American Chemical Society.

* cited by examiner

US 11,046,592 B2

PRODUCTION OF REACTIVE OXIDATIVE SPECIES BY PHOTOCATALYTIC ACTIVATION OF CHLORINE (I) UNDER ULTRAVIOLET/VISIBLE LIGHT/NEAR INFRARED IRRADIATION

CROSS-REFERENCE TO RELATED APPLICATION

This application claims the benefit of U.S. Provisional Application Ser. No. 62/917,202, filed Nov. 28, 2018, which is hereby incorporated by reference in its entirety including any tables, figures, or drawings.

BACKGROUND OF THE INVENTION

The UV/chlorine advanced oxidation process (AOP) is an emerging technology for degrading micro-pollutants in drinking water treatment. Currently, activation of chlorine is based on the dissociation of HOCl into hydroxyl radical and chlorine radical under UV irradiation. Even solar photolysis requires activation in the UV-A/UV-C range. The process produces hydroxyl radicals (HO•) and reactive chlorine species, which complement each other in the contaminant degradation. Unreacted free chlorine after the UV/chlorine AOP provides residual protection in water distribution systems. Furthermore, the UV/chlorine AOP reduces the disinfection byproduct formation and toxicity during the post-chlorination stage, compared with the UV/peroxide AOP. However, activation of free chlorine by UV irradiation remains energy intensive and environmental unfriendly. This process uses only UV light, which is emitted from LPUV lamps with an efficiency of up to 40% and made of mercury. Long et al. *J. Phys. Chem.*, 1980 84(5), 555-557 found that free chlorine can be activated by superoxide radicals ($O_2^{•-}$) to produce HO• at a second-order reaction rate constant of $7.5\pm0.38\times10^6\ M^{-1}\ s^{-1}$. Yet, the production of reactive oxidative species from the free chlorine activation by a less energy intensive ultraviolet/visible light/near infrared light photocatalytic process is not disclosed.

BRIEF SUMMARY OF THE INVENTION

An embodiment of the invention is directed to a system for the production of reactive oxidative species in a fluid medium where the system includes a source of Cl(I), a solid photocatalyst, and a source of electromagnetic radiation. The photocatalyst in the system, in direct contact with the fluid medium containing chlorine (I) while under irradiation with electromagnetic radiation in the ultraviolet, near-ultraviolet, visible, near-infrared, or any combination thereof. The source of the electromagnetic radiation can include one or more lamps, one or more light emitting diodes (LEDs), or sunlight. The source of Cl(I) can include $Cl_2$, $NH_2Cl$, HOCl, or any combination thereof. The solid photocatalyst can include $g-C_3N_4$, $TiO_2$, BBiOBr, $Cu_2(OH)PO_4$, other photocatalysts, or any combination thereof.

An embodiment of the invention is directed to a method of producing reactive oxidative species by photocatalytic activation of chlorine (I) under ultraviolet, visible light, and/or near infrared. The method involves irradiating the solid photocatalyst with electromagnetic radiation and the photocatalyst is in direct contact with a fluid medium containing a source of chlorine(I). The photocatalyst can be suspended in the fluid or residing on a surface that is contactable by the fluid. The fluid and solid photocatalyst can be within a container. The chlorine (I) can be in-situ formed or added. The reactive oxidative species, including but not limited to hydroxyl radicals, superoxide radicals, chlorine containing radicals, and singlet oxygen, which can be used for surface water/groundwater/wastewater/potable water decontamination, water disinfection, air purification, mold control and destruction, organic synthesis, or for any applications that requires reactive oxidative species.

In an exemplary method, water comprising at least one micro-contaminant to a container and irradiating the photocatalysts in water within at least a portion of the container with electromagnetic radiation. The irradiated water can be stagnant water within the container, or the container can be configured such that the irradiation occurs in at least a portion of the container, for example a flow through cell, where the water is under flow. The flow through cell may include reflectors to optimize the absorption of the light entering the cell.

DETAILED DISCLOSURE OF THE INVENTION

Figure 1:
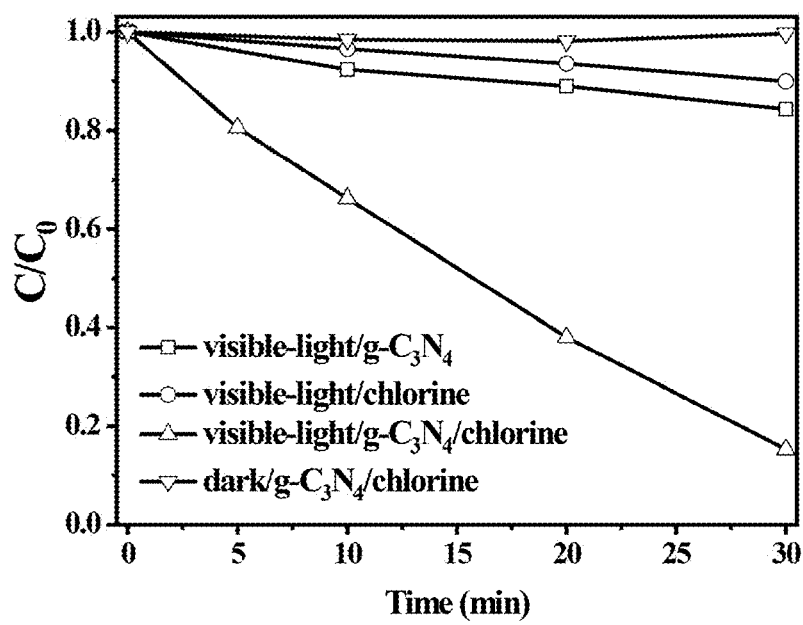
FIG. 1 shows a plot of CBZ degradation under combination of factors where: pH=7.0, $[CBZ]_0$=2.0 μM, $[g-C_3N_4]$=1.0 g/L, $[Chlorine]_0$=5.0 mg/L as $Cl_2$.

An embodiment of the invention is directed to the formation of reactive oxidative species by an AOP using photocatalysts that are activated by UV, visible and near infrared light. Various types of lamps, LEDs or sunlight can be used as the light source, where a suitable irradiation induces a photocatalyst to generate photoinduced species that activate chlorine. The activation of chlorine by this process can form various reactive oxidative species. The process activates chlorine using electrons, holes, and superoxide radicals that are generated after photocatalysts are activated by either UV or visible light or infrared. This activation produces larger amount of reactive oxidative species than the direct photolysis of chlorine under UV light and enables the activation of chlorine to form radicals by visible light or infrared radiation. The photocatalytic process forms a significant amount of electrons, holes, and superoxide radicals upon light irradiation using, singularly, or in combination: low cost, non-toxic, and stable visible light photocatalysts, such as, but not limited to, graphitic carbon nitride (g-$C_3N_4$); low cost, non-toxic, and stable UV light photocatalysts, such as, but not limited to, titanium dioxide ($TiO_2$); or low cost, non-toxic, and stable infrared photocatalysts, such as, but not limited to, $Cu_2(OH)PO_4$, which activates free chlorine under UV, visible light, and/or infrared irradiation. The process can be used in any application where a component of a fluid medium is transformed by a reactive oxidative species to, for example: degrade micropollutants, for example one of the most frequently detected recalcitrant micro-pollutants, carbamazepine (CBZ); disinfect pathogens in water or during post-harvesting processing of vegetables & fruits; sterilize molds; remove indoor air formaldehyde; remediate groundwater; and synthesize polymers.

The activation of chlorine to produce reactive oxidative species is based on the reaction between the photo-induced species and HOCl/ClO$^-$, which is an absolutely novel method to activate HOCl/ClO$^-$ to produce reactive oxidative species. The method produces larger amount of reactive oxidative species than the direct photolysis of chlorine under UV light. The method enables the activation of chlorine in water to form reactive radical species, including but not limited to hydroxyl radicals, superoxide radicals, chlorine containing radicals, and singlet oxygen, under visible light or infrared, which is impossible for chlorine under direct visible light or infrared irradiation. In an embodiment of the invention, the photocatalytic process, where, rather than employing less powerful superoxide radicals, or low concentrations of reactive species, including but not limited to, electrons, holes, and hydroxyl radicals, can utilize these reactive species to activate chlorine and produce larger amount and more powerful reactive radical species, including but not limited to hydroxyl radicals, superoxide radicals, chlorine containing radicals, and singlet oxygen, in the fluid medium under either UV, visible light, or infrared irradiation.

The process is less limited by the environmental factors, for example, the water matrices when water comprises the fluid medium. Generally, penetration of UV light is more difficult than visible light or near infrared light. Therefore, UV transmittance can highly affect the performance of the UV/Chlorine AOP system. Resistance to light penetration is less for visible light or near infrared light. One example, which illustrates production of large amounts of strong radicals is the degradation of aqueous CBZ by vis/g-$C_3N_4$/chlorine and the degradation of aqueous CBZ and HCHO by near UV/$TiO_2$/chlorine.

Figure 2A:
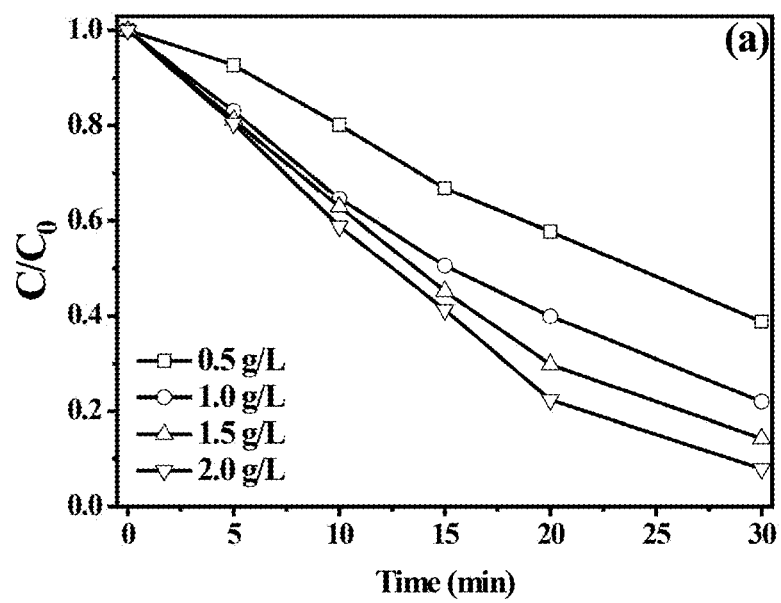
FIG. 2A shows composite plots of CBZ degradation for various $g-C_3N_4$ quantities at: pH=7.0, $[CBZ]_0$=2.0 μM, $[Chlorine]_0$=2.0 mg/L as $Cl_2$.
Figure 2B:
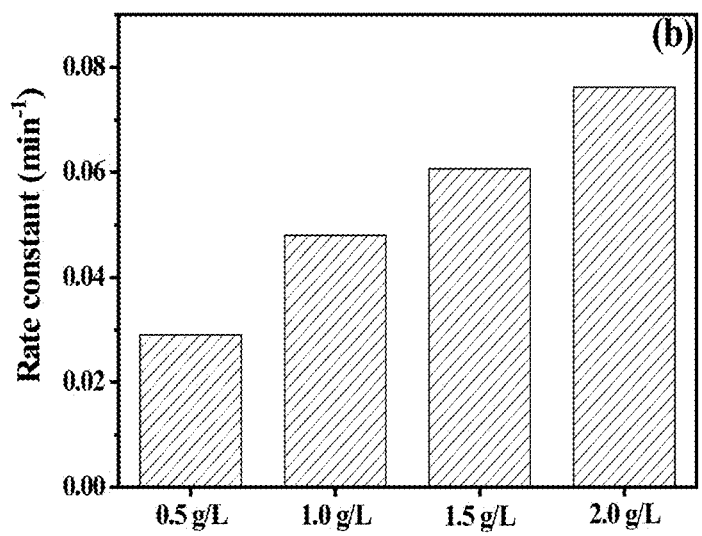
FIG. 2B shows bar charts for the apparent rate constant for various $g-C_3N_4$ quantities at: pH=7.0, $[CBZ]_0$=2.0 μM, $[Chlorine]_0$=2.0 mg/L as $Cl_2$.
Figure 3A:
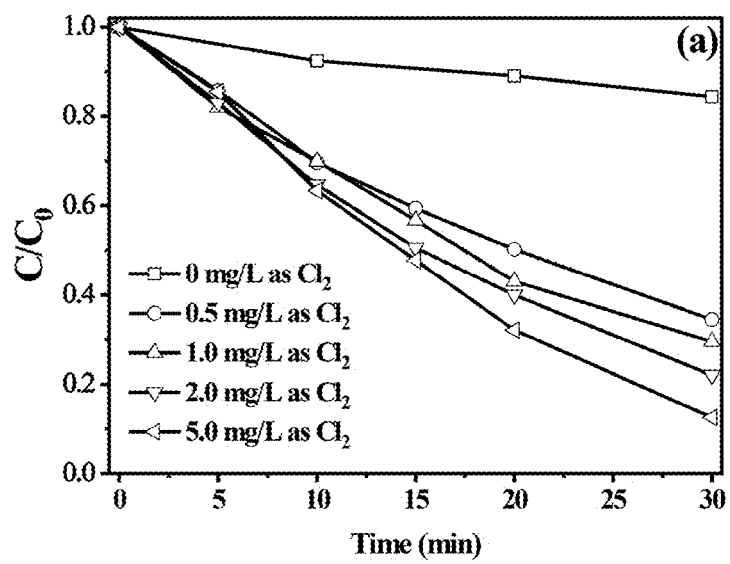
FIG. 3A shows composite plots of CBZ degradation for various initial $Cl_2$ concentrations at: pH=7.0, $[CBZ]_0$=2.0 μM, $[g-C_3N_4]$=1.0 g/L.
Figure 3B:
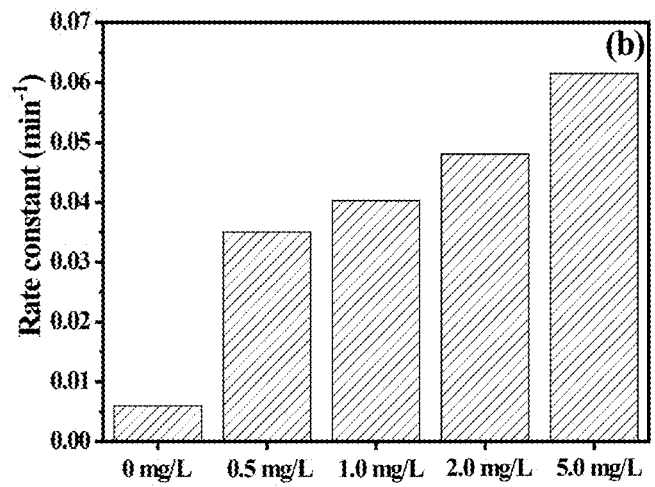
FIG. 3B shows a bar chart for the apparent rate constant for various initial $Cl_2$ concentrations at: pH=7.0, $[CBZ]_0$=2.0 μM, $[g-C_3N_4]$=1.0 g/L.

FIG. 1 shows plots of CBZ degradation by the vis/chlorine, vis/g-$C_3N_4$, vis/g-$C_3N_4$/chlorine and dark/g-$C_3N_4$/chlorine processes over 30 minutes after the addition of 1.0 g/L g-$C_3N_4$, 5.0 mg/L free chlorine, and both. No CBZ degradation is achieved in the dark in the presence of g-$C_3N_4$ and chlorine. Over this period, about 10% CBZ degrades using visible light with chlorine or visible light with g-$C_3N_4$. In the same period, more than 80% of CBZ was degraded with visible light with the combination of g-$C_3N_4$ and chlorine, an apparent synergistic enhancement of CBZ degradation. The effects of g-$C_3N_4$ and free chlorine dosages on the CBZ degradation in the vis/g-$C_3N_4$/chlorine process are shown in FIGS. 2A-2B and 3A-3B, respectively. FIGS. 2A and 3A, the CBZ degradation in the vis/g-$C_3N_4$/chlorine process at different g-$C_3N_4$ and free chlorine dosages, respectively, follows pseudo-first order degradation kinetic. Their degradation rate constants are shown in FIGS. 2B and 3B. The CBZ degradation rate constants increase linearly 2.6 fold from 0.0291 to 0.0762 min$^{-1}$ with an increasing g-$C_3N_4$ content of 4 fold from 0.5 to 2.0 g/L. However, the increase of the CBZ degradation rate constant is about 1.8 fold from 0.0350 to 0.0615 min$^{-1}$ with increasing free chlorine content of 10 times fold from 0.5 to 5.0 mg/L. This comparison suggests that g-$C_3N_4$ content is the limiting factor in the vis/g-$C_3N_4$/chlorine process.

Figure 4A:
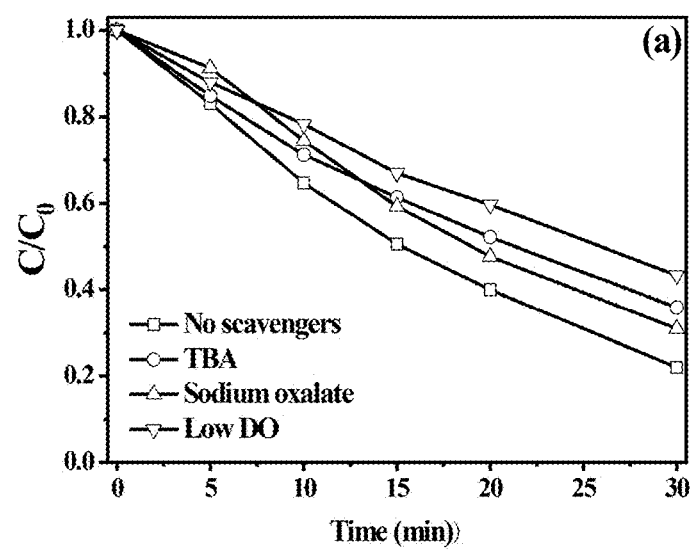
FIG. 4A shows composite plots of CBZ degradation for various radical scavengers at: pH=7.0, $[CBZ]_0$=2.0 μM, $[g-C_3N_4]$=1.0 g/L, $[Chlorine]_0$=2.0 mg/L as $Cl_2$, [TBA]=[Sodium oxalate]=2.0 mM, [DO]≈0.5 mg/L.
Figure 4B:
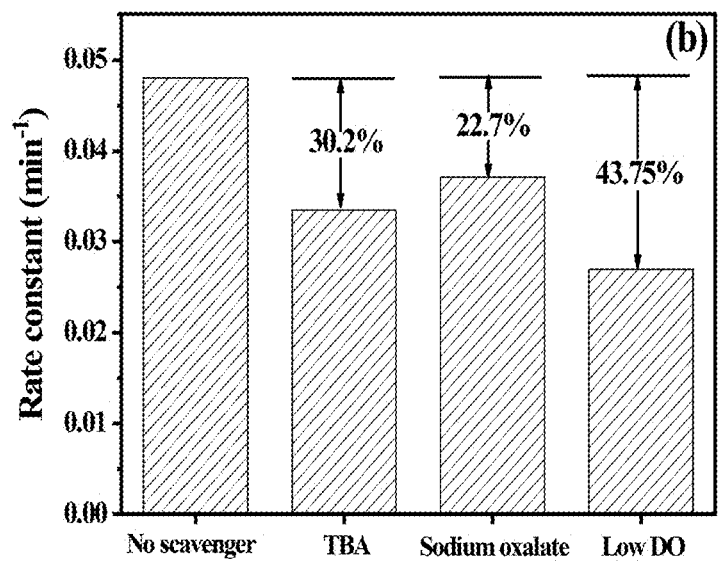
FIG. 4B shows a bar chart for the apparent rate constant for various radical scavengers at: pH=7.0, $[CBZ]_0$=2.0 μM, $[g-C_3N_4]$=1.0 g/L, $[Chlorine]_0$=2.0 mg/L as $Cl_2$, [TBA]=[Sodium oxalate]=2.0 mM, [DO]≈0.5 mg/L.

FIG. 4A shows CBZ degradation kinetics by the vis/g-$C_3N_4$/chlorine process in the presence of various radical scavengers or at low dissolved oxygen (DO) concentrations to investigate the contributions of different reactive species to the synergistic enhancement. Tert-butanol (TBA) and sodium oxalate were used as a HO• and a hole scavenger, respectively. As shown in FIG. 4B, the degradation rate constants of CBZ decreased by 30.2% and 22.7% in the presence of TBA and sodium oxalate, indicating that both HO• and holes contributes to the synergistic enhancement in the degradation of CBZ. When the solution DO was reduced to 0.5 mg/L, the CBZ degradation rate constant decreased by 43.75%. This may be attributed to the lower concentrations of $O_2^{•-}$ available in activating free chlorine to generate HO•, because the generation of $O_2^{•-}$ from the reaction between $O_2$ and photo-induced electrons is greatly inhibited under the low DO condition. However, the CBZ degradation rate constant at low DO concentration is still 3.4 times larger than that in the absence of free chlorine, suggesting that free chlorine may also be activated by photo-induced holes/electrons to form reactive radical species. Free chlorine in this case, comprise Cl$^{(+1)}$ chemicals, including, but not limited to, hypochlorite, hypochloric acid and dichlorine.

Figure 5A:
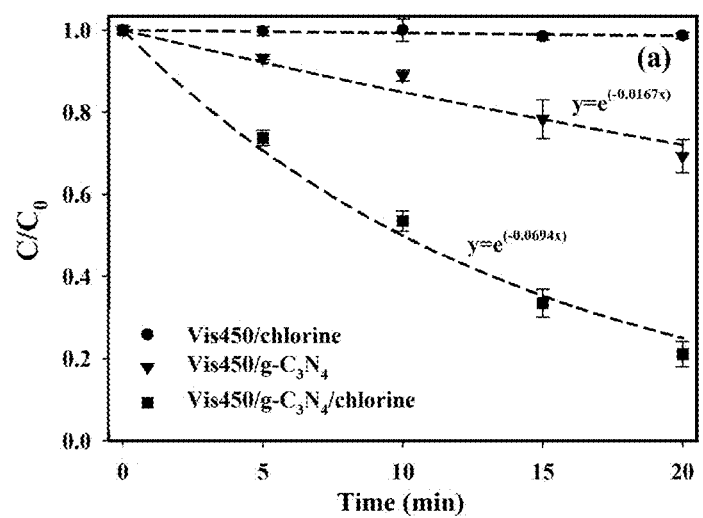
FIG. 5A shows composite plots of CBZ degradation by various combinations of components of $Vis_{450}/g-C_3N_4$/chlorine at pH=7.0, $[g-C_3N_4]$=1.0 g/L, and $[Chlorine]_0$=5.0 mg/L as $Cl_2$.
Figure 5B:
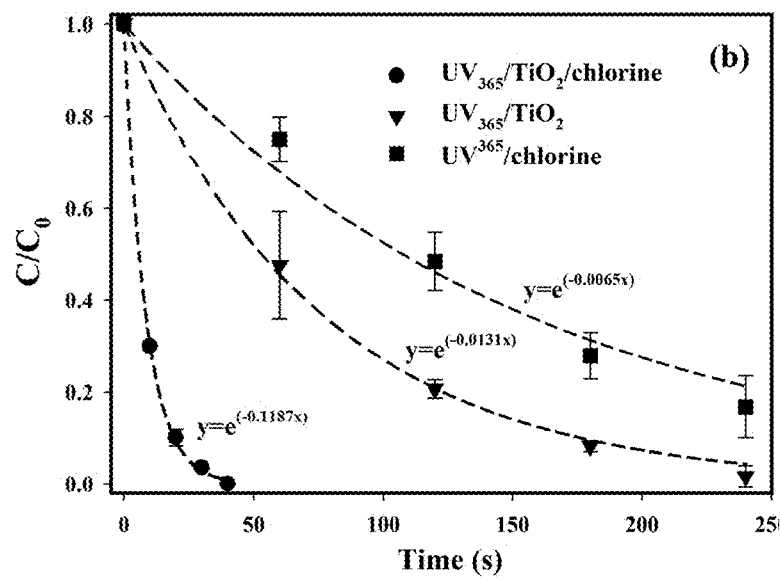
FIG. 5B shows composite plots of CBZ degradation by various combinations of components of $UV_{365}/TiO_2$/chlorine at pH=7.0, $[TiO_2]$=0.1 g/L, and $[Chlorine]_0$=5.0 mg/L as $Cl_2$.

In addition to or instead of g-$C_3N_4$, other photocatalysts, under the irradiation of the same or other regions of the electromagnetic spectrum may be used, including ultraviolet light, visible light and near infrared light, to activate free chlorine. The degradation of CBZ under UV irradiation of $TiO_2$ at 365 nm and visible light irradiation of g-$C_3N_4$ at 450 nm were tested and the results are shown in FIGS. 5A and 5B. The chlorine activation by g-$C_3N_4$ under 450 nm 5 W visible LED irradiation is shown in FIG. 5A, where no CBZ degradation occurs with irradiation of Vis$_{450}$/chlorine with no catalyst, indicating that chlorine cannot be directly activated by 450 nm visible light. On the other hand, more than 80% of CBZ is degraded using the catalyzed Vis$_{450}$/g-$C_3N_4$/chlorine process, which was four times more active than the Vis$_{450}$/g-$C_3N_4$ process lacking chlorine. This significant enhancement of CBZ degradation suggests activation of chlorine by g-$C_3N_4$ photocatalytic process. Similar enhancement occurs by the coupling chlorine with an $UV_{365}/TiO_2$ process. As shown in FIG. 5B, it takes about 240 s and 150 s to degrade 85% of CBZ by $UV_{365}$/chlorine and $UV_{365}/TiO_2$ processes, respectively. In contrast 85% degradation occurs in 20 s using an $UV_{365}/TiO_2$/chlorine process.

Figure 6:
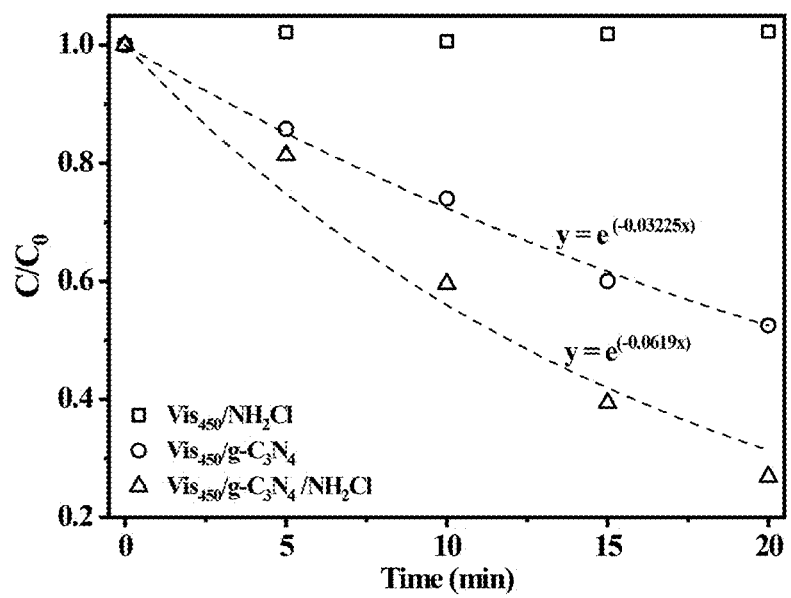
FIG. 6 shows composite plots for degradation of CBZ in the presence of $NH_2Cl$ and $g-C_3N_4$ under visible light irradiation at: pH=7.0, $[CBZ]_0$=2.0 μM, $[g-C_3N_4]$=1.0 g/L, $[NH_2Cl]_0$=5.0 mg/L as $Cl_2$.

The degradation of CBZ using HOCl and monochloramine ($NH_2Cl$) under visible light irradiation of g-$C_3N_4$ at 450 nm results in the enhanced degradation of CBZ. As indicated in FIG. 6, the Cl(I) containing species, $NH_2Cl$, is activated by g-$C_3N_4$ under 450 nm 5 W visible LED irradiation.

Figure 7A:
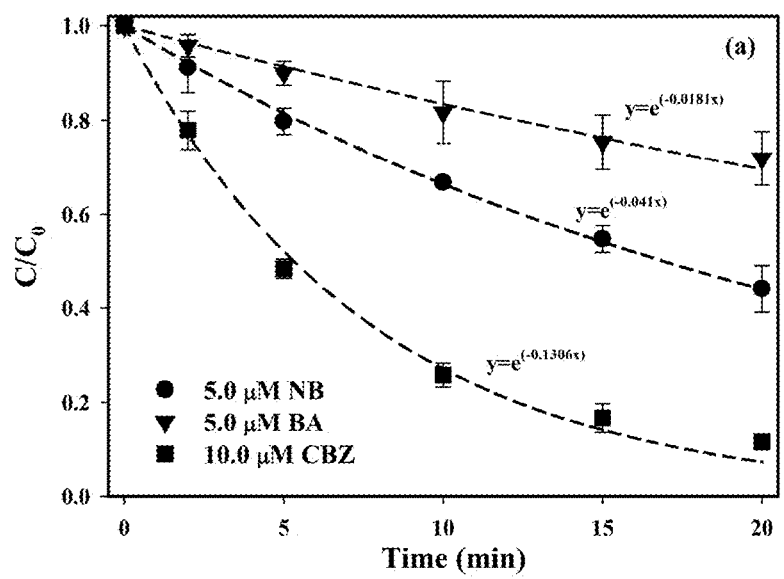
FIG. 7A shows composite plots for degradation of different contaminates by the photocatalytic AOPs system $Vis_{450}/g-C_3N_4$/chlorine at pH=7.0, $[g-C_3N_4]$=2.0 g/L, $[Chlorine]_0$=5.0 mg/L as $Cl_2$.
Figure 7B:
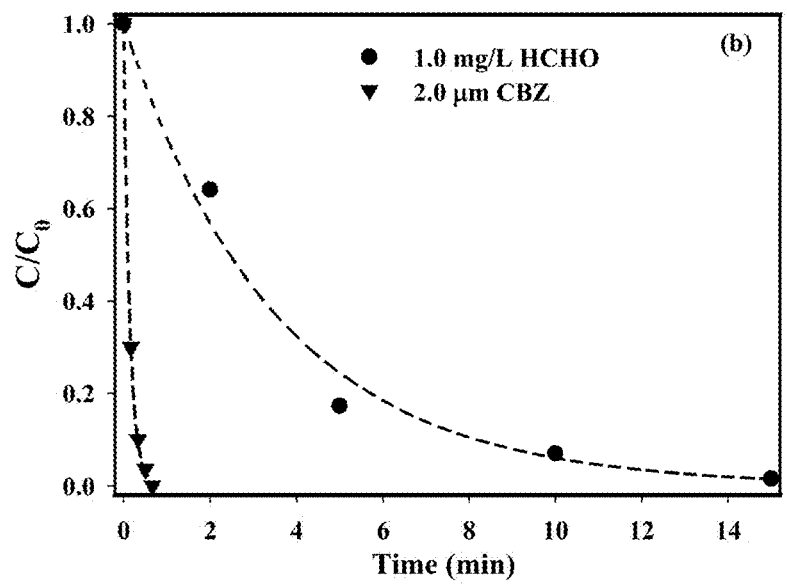
FIG. 7B shows composite plots for degradation of different contaminates by the photocatalytic AOPs system $UV_{365}/TiO_2$/chlorine at pH=7.0, $[TiO_2]$=0.1 g/L, $[Chlorine]_0$=5.0 mg/L as $Cl_2$.

The photocatalytic chlorine activation process selectively degrades micro-pollutants. For example, the degradation of CBZ, NB and BA under UV irradiation of $TiO_2$ at 365 nm, and the degradation of HCHO and CBZ under visible light irradiation of g-$C_3N_4$ at 450 nm are shown in FIG. 7A, selectively degrades different compounds. The $Vis_{450}$/g-$C_3N_4$/chlorine process shows the highest reactivity towards CBZ, follows by NB and BA. The $UV_{365}/TiO_2$/chlorine process also displays higher reactivity towards CBZ than HCHO, as shown in FIG. 7B.

Figure 8:
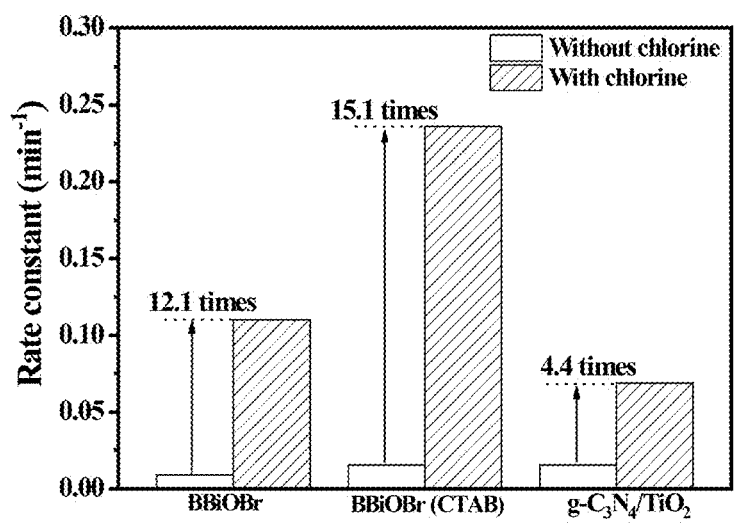
FIG. 8 shows a bar chart for the apparent rate constant for different photocatalysts under visible light irradiation at: pH=7.0, $[CBZ]_0$=2.0 μM, [photocatalyst]=1.0 g/L, $[Chlorine]_0$=5.0 mg/L as $Cl_2$.

The photocatalysts used in the photocatalytic chlorine activation process is not limited to metal oxide based photocatalyst, such as $TiO_2$, or non-metal based photocatalyst, such as g-$C_3N_4$. As shown in FIG. 8, other photocatalysts, such as boron based photocatalyst BBiOBr and BBiOBr(CTAB), and z-scheme based photocatalyst such as g-$C_3N_4/TiO_2$, initiate the photocatalytic chlorine activation process, and enhance the activation process.

All publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

What is claimed is:

1. A system for reactive oxidative species production, comprising:
    a source of Cl(I);
    a solid photocatalyst;
    a source of electromagnetic radiation; and
    a fluid medium, wherein the fluid medium contains the source of Cl(I), and wherein the fluid medium is in direct contact with the solid photocatalyst,
    wherein the solid photocatalyst comprises g-$C_3N_4$, BBiOBr, $TiO_2$/g-$C_3N_4$, $Cu_2(OH)PO_4$, or any combination thereof.

2. The system for reactive oxidative species production according to claim 1, wherein the source of Cl(I) comprises $Cl_2$, $NH_2Cl$, HOCl, or any combination thereof.

3. The system for reactive oxidative species production according to claim 1, wherein the solid photocatalyst comprises g-$C_3N_4$, $Cu_2(OH)PO_4$, or any combination thereof.

4. The system for reactive oxidative species production according to claim 1, wherein the electromagnetic radiation is ultraviolet, near-ultraviolet, visible, near-infrared, or any combination thereof.

5. The system for reactive oxidative species production according to claim 1, further comprising a source of oxygen.

6. The system for reactive oxidative species production according to claim 1, wherein the source of the electromagnetic radiation comprises one or more lamps, one or more light emitting diodes (LED), sunlight, or any combination thereof.

7. The system for reactive oxidative species production according to claim 1, wherein the fluid medium comprises water, an aqueous solution, or an aqueous suspension.

8. The system for reactive oxidative species production according to claim 1, wherein the system is a water decontamination and/or disinfection system.

9. The system for reactive oxidative species production according to claim 1, wherein the system is an air purification system.

10. The system for reactive oxidative species production according to claim 1, wherein the system is a mold prevention and/or removal system.

11. The system for reactive oxidative species production according to claim 1, wherein the system is an organic chemical reactor.

12. A method of forming reactive oxidative species, comprising:
    providing the system according to claim 1;
    combining the fluid medium and the source of Cl(I) into a mixture;
    contacting the mixture with the solid photocatalyst; and
    irradiating the solid photocatalyst with electromagnetic radiation.

13. A method of forming reactive oxidative species, comprising:
    providing a system for reactive oxidative species production, the comprising:
        a source of Cl(I);
        a solid photocatalyst;
        a source of electromagnetic radiation; and
        a fluid medium, wherein the fluid medium contains the source of Cl(I), and wherein
    the fluid medium is in direct contact with the solid photocatalyst;
    combining the fluid medium and the source of Cl(I) into a mixture;
    contacting the mixture with the solid photocatalyst; and
    irradiating the solid photocatalyst with electromagnetic radiation,
    wherein the electromagnetic radiation comprises visible light and the solid photocatalyst comprises g-$C_3N_4$, BBiOBr, or $Cu_2(OH)PO_4$.

14. The method according to claim 12, wherein the electromagnetic radiation comprises ultraviolet light and the photocatalyst comprises $TiO_2$.

15. The method according to claim 12, wherein the source of Cl(I) comprises $Cl_2$, $NH_2Cl$, HOCl or any combination thereof.

16. The method according to claim 12, wherein irradiating the solid photocatalyst comprises irradiating the solid surface suspended in the fluid medium or residing on a surface.

17. The method according to claim 12, wherein the fluid medium is water, and wherein combining the fluid medium and the source of Cl(I) into a mixture comprises dissolving the source of Cl(I) in the water.

18. The method according to claim 13, wherein the source of Cl(I) comprises $Cl_2$, $NH_2Cl$, HOCl or any combination thereof.

19. The method according to claim 13, wherein irradiating the solid photocatalyst comprises irradiating the solid surface suspended in the fluid medium or residing on a surface.

20. The method according to claim 13, wherein the fluid medium is water, and wherein combining the fluid medium and the source of Cl(I) into a mixture comprises dissolving the source of Cl(I) in the water.

\* \* \* \* \*